United States Patent
Bohlander

(10) Patent No.: US 8,460,453 B2
(45) Date of Patent: Jun. 11, 2013

(54) ALUMINUM-CONTAINING WATERGLASS SOLUTIONS

(75) Inventor: Ralf Bohlander, Erkrath (DE)

(73) Assignee: Cognis IP Management GmbH, Duesseldorf (DE)

(*) Notice: Subject to any disclaimer, the term of this patent is extended or adjusted under 35 U.S.C. 154(b) by 0 days.

(21) Appl. No.: 13/499,856

(22) PCT Filed: Sep. 28, 2010

(86) PCT No.: PCT/EP2010/005961
§ 371 (c)(1),
(2), (4) Date: Apr. 2, 2012

(87) PCT Pub. No.: WO2004/014813
PCT Pub. Date: Feb. 19, 2004

(65) Prior Publication Data
US 2012/0196736 A1    Aug. 2, 2012

(30) Foreign Application Priority Data
Oct. 5, 2009 (EP) .................................... 09012553

(51) Int. Cl.
*C01B 33/32* (2006.01)
*C01B 33/26* (2006.01)
*C04B 12/04* (2006.01)

(52) U.S. Cl.
USPC .................. 106/287.1; 106/286.7; 106/286.8; 106/600; 423/332; 423/333; 423/334

(58) Field of Classification Search
USPC ......... 106/287.1, 600, 286.7, 286.8; 423/332, 423/333, 334
See application file for complete search history.

(56) References Cited

U.S. PATENT DOCUMENTS

| 2,933,456 A | * | 4/1960 | Braithwaite | 502/9 |
| 5,482,693 A | * | 1/1996 | Rushmere et al. | 423/328.1 |
| 2004/0018146 A1 | | 1/2004 | Hosokawa et al. | |

FOREIGN PATENT DOCUMENTS

WO    WO-2004/014813    2/2004

OTHER PUBLICATIONS

Mitra, N. K. et al., "Studies on Alkali Alumino-silicate Hydrogel: Part I-Effect of Experimental Variable on Gel Formation", *Transactions of the Indian Ceramic Society* vol. XXXI (1) 1972, pp. 31-35.
Mitra N. K. et al., "Studies on Alumino-Silicate Hydrogel-Part II: Light Scattering Studies on the Gelation in Aqueous Phase", *Transactions of the Indian Ceramic Society* vol. XXXI (2) 1972, pp. 52-56.
Ueda, Satoru et al., "Crystallization of analcime solid solutions from aqueous solutions", *American Mineralogist* vol. 64 1979, pp. 172-179.

* cited by examiner

*Primary Examiner* — Anthony J Green
(74) *Attorney, Agent, or Firm* — Servilla Whitney LLC

(57) ABSTRACT

The invention relates to a process for preparing clear aqueous solutions of silicates, remaining stable at 20° C. on storage for at least 6 months, containing 20% to 40% by weight $SiO_2$, 10% to 20% by weight $M_2O$, where M is a cation from the group consisting of $Li^+$, $Na^+$, $K^+$ and $NY4^+$ and Y is an alkyl or alkenyl radical having 1 to 6 C atoms, 0.5% to 6% by weight $Al_2O_3$ and 100% by weight water, by introducing an aqueous solution of a silicate of the general formula $M_2O$ x $nSiO_2$, in which M is a cation from the group consisting of $Li^+$, $Na^+$, $K^+$ and $NY4^+$, and where Y is an alkyl or alkenyl radical having 1 to 6 C atoms, and n is a number in the range from 1 to 5, and metering in an aluminium compound in such a way that the viscosity of the reaction mixture remains below 10 000 mPas, and the reaction being carried out in a temperature range from 20 to 140° C., with the proviso that, following the metered addition of the total amount of the aluminium compound, the reaction mixture is cooled to room temperature as soon as the reaction mixture is clear.

8 Claims, No Drawings

ALUMINUM-CONTAINING WATERGLASS SOLUTIONS

CROSS-REFERENCE TO RELATED APPLICATIONS

This application is the national stage entry of PCT/EP2010/005961, filed on Sep. 28, 2010, which claims priority to European Patent Application No. EP 09012553.5, filed on Oct. 5, 2009, both of which are incorporated herein by reference in their entireties.

FIELD

Aspects of the invention relate to clear solutions of alkali metal silicates (water glasses) which have an aluminum content of at least 0.5% and are stable on storage in the long term, and also a process for preparing these solutions.

BACKGROUND

To a person skilled in the art, the term water glass refers to vitreous, water-soluble alkali metal silicates (i.e. alkali metal salts of silicic acids) solidified from the melt, or viscous aqueous solutions thereof. In water glass, from 1 to 5 mol of $SiO_2$ are typically present per 1 mol of alkali metal oxide ($Alk_2O$—where Alk represents the alkali metals lithium, sodium and potassium), which is why sodium and potassium water glasses are usually also characterized by the ratio % $SiO_2$ to % alkali metal oxide. Water glasses are thus chemically alkali metal silicates having a molar ratio (MR) of $SiO_2$ to $Alk_2O$ in the range from 1 to 5, where this molar ratio is the molar ratio of the building blocks $SiO_2$ and $Alk_2O$ constituting the alkali metal silicate. They contain oligomeric silicate anions with alkali metal cations as counterions.

Water glasses in the pure state are colorless glasses which form colloidal clear, alkaline solutions with water at elevated temperature and pressure. Water glass is usually prepared by melting silica sand with sodium carbonate or potassium carbonate at from 1400 to 1500° C., with the silica driving off the $CO_2$. The solidified melt is either sold commercially in the milled state or is converted into an aqueous solution of the desired concentration. Aqueous solutions have the advantage of better applicability in a range of different fields of use.

Liquid water glass solutions, i.e. aqueous solutions of alkali metal silicates, are produced industrially from solid alkali metal silicate lumbar glass by pressure dissolution of the latter in water in autoclaves. As an alternative, sand can also be directly hydrothermally dissolved in concentrated alkali metal hydroxide solution, but only solutions having a low MR can be obtained.

As is known to those skilled in the art, a melt of alkali metal silicate is firstly formed in the preparation of water glass in a melting furnace, and this melt solidifies on cooling to room temperature to form glass pieces (known as lumbar glass). These glass pieces are industrially dissolved in water in pressure autoclaves, usually at elevated temperature, for instance at about 120° C. (known as the dissolution process). Industrial water glass solutions usually have a solids content of from about 30 to 50% by weight.

Industrial water glasses are generally not prepared using very pure quartz as $SiO_2$ raw material source because of the lack of availability in large quantities but instead are produced using sand, and technical-grade water glass solutions therefore usually contain traces of particular metals. Commercial water glass solutions therefore contain, regardless of the production route, metallic impurities due to the raw material, with these impurities being present in total amounts below 0.3% and in the case of aluminum below 0.2%, usually significantly below, in clear, storage-stable aqueous solutions; as usual, these percentages are percent by weight of the respective metal oxide based on the total aqueous solution of the alkali metal silicate. The reason why the content of "metallic impurities" in water glasses is only so low is that only "pure" alkali metal silicates are water-soluble and only very small proportions of two- or three-valent metal cations form water-insoluble compounds. Since proportions of insoluble material would interfere in virtually all applications because of their tendency to separate out, they are separated off in industry by sedimentation, centrifugation or filtration in order to obtain clear, transparent storage-stable water glass solutions.

It is also generally known that water glass solutions react very sensitively to addition of even small amounts of aluminum-containing solutions, usually by immediate gelling and delayed precipitation of solids. There is therefore an in-principle difficulty when the content of aluminum in water glass solutions is to be set to a value above about 0.2-0.3% (percent by weight of $Al_2O_3$ based on the total aqueous solution of the alkali metal silicate). This has been confirmed in in-house tests by the applicant. Here, the applicant has found that an attempt to carry out a direct synthesis of clear aqueous alkali metal silicate solutions having a relatively high aluminum content from the inexpensive raw materials sand, NaOH and an aluminum source by the hydrothermal production route is also unsuccessful.

Mixtures of water glass solutions with aluminate solutions are used industrially to prepare aluminosilicates as amorphous molecular sieves or crystalline zeolites. This illustrates, from another perspective, the abovementioned difficulty of producing clear water glass solutions having an elevated aluminum content. Studies by the applicant have confirmed that combining water glass solutions with aluminate solutions leads to precipitation or crystallization, with the liquid phase being depleted in aluminum so that an alkali metal silicate solution having virtually no Al content remains as mother liquor after the precipitation is complete.

Mitra, Transaction Ind.Ceram.Soc, Vol XXXI 1972, p.31ff describes Alk/Si/Al variations within a wide range, dilutions and temperatures in the range 0-95° C., but with the result that all mixtures gel or become turbid after not more than 24 hours.

In American Mineralogist, V64, 1979, p.172ff, Ueda indicates that clear solutions of aluminates in water glass solutions can also exist but with the restriction that this is possible only at $Al_2O_3/SiO_2$ ratios in the range from 1:70 to 1:320, which for a conventional water glass solution having an alkali metal silicate solids content of 40% by weight mathematically means that $Al_2O_3$ can be present in a maximum amount of 0.4% by weight. This prior art thus confirms to a person skilled in the art the known fact that it is extremely difficult to prepare clear aqueous solutions of alkali metal silicates (water glasses) which have an appreciable aluminum content and are stable on storage in the long term and do not gel and indicates that it could be possible to prepare such solutions having a maximum aluminum content of at most 0.4% by weight.

SUMMARY

Aspects of the invention relate to clear aqueous solutions of silicates (water glasses), and methods of preparing same. In one or more embodiments, the clear aqueous solutions of silicates contain from 20 to 40% by weight of $SiO_2$, from 10 to 20% by weight of $M_2O$, where M is a cation selected from the group consisting of $Li^+$, $Na^+$, $K^+$, $NY_4^+$ and Y is an alkyl or alkenyl radical having from 1 to 6 carbon atoms, from 0.5 to 6% by weight of $Al_2O_3$ and water, and are stable on storage at 20° C. for at least six months.

DETAILED DESCRIPTION

Provided herein are clear aqueous solutions of silicates (water glasses) having an aluminum content of at least 0.5% by weight (% by weight of $Al_2O_3$ based on the total aqueous solution of the silicate). The solutions should be storage-stable for a period of at least six months at 20° C., i.e. remain clear and not gel or form precipitates within this period of time.

The applicant has now been able to achieve such clear aqueous solutions of silicates, even though the prior art indicates that this is extraordinarily difficult if not virtually impossible.

The invention firstly provides a process for preparing clear aqueous solutions of silicates (water glasses) which contain
  from 20 to 40% by weight of $SiO_2$,
  from 10 to 20% by weight of $M_2O$, where M is a cation selected from the group consisting of $Li^+$, $Na^+$, $K^+$, $NY_4^+$ and Y is an alkyl or alkenyl radical having from 1 to 6 carbon atoms,
  from 0.5 to 6% by weight of $Al_2O_3$ and
  water
and are stable on storage at 20° C. for at least six months, wherein
  an aqueous solution of a silicate (water glass) of the general formula $M_2O \times nSiO_2$, where M is a cation selected from the group consisting of $Li^+$, $Na^+$, $K^+$, $NY_4^+$ and Y is an alkyl or alkenyl radical having from 1 to 6 carbon atoms and n is in the range from 1 to 5, is placed in a reaction vessel and
  an aluminum compound is introduced in such a way that the viscosity of the reaction mixture remains below 10 000 mPas and the reaction is carried out in a temperature range from 20 to 140° C.,
  with the proviso that the reaction mixture after introduction of the total amount of the aluminum compound is cooled to room temperature as soon as the reaction mixture is clear.

The viscosity indicated is measured under reaction conditions and reaction temperature in accordance with ISO 12058-1.

The reaction is preferably carried out with stirring.

The Al-containing silicate solutions which can be obtained by the process of the invention are preferably set to a viscosity of at least 100 mPas and in particular a viscosity in the range from 100 to 1000 mPas (the viscosity reported is in each case the viscosity of the silicate solutions as such at 20° C., measured by the method of ISO 12058-1). The viscosity is set essentially by selection of the concentrations of the reactants.

The process of the invention guarantees that the aqueous aluminum-containing silicate solutions obtained are composed of a single component and are clear, do not gel and remain clear and do not form a sediment and retain this behavior over a period of at least six months at 20° C., which is a really excellent storage stability, despite their high aluminum content. This can be considered to be extraordinarily surprising in view of the prior art cited.

The reaction is particularly preferably carried out in the temperature range from 50 to 110° C. and in particular from 60 to 80° C. The temperature range from 60 to 80° C. guarantees silicate solutions which are particularly storage-stable in the long term.

As indicated, the critical step of the process of the invention is to place an aqueous solution of a silicate (water glass) as defined above in a reaction vessel and introduce an aluminum compound in such a way that the viscosity of the reaction mixture remains below 10 000 mPas. This indicates that the rate of addition of the aluminum source is a very important parameter. If the aluminum source is added too quickly with the result that the viscosity of the reaction mixture exceeds the value indicated, clear solutions which are storage-stable in the long term are not obtained. The aluminum source must therefore, according to the process of the invention, be introduced only at such a rate that the viscosity of the reaction mixture continually remains below 10 000 mPas. The aluminum source is preferably introduced at such a rate that the viscosity of the reaction mixture remains below 1000 mPas.

The nature of the silicates (water glasses) used is not critical per se. Preference is given to using alkali metal silicates, i.e. compounds $M_2O \times nSiO_2$, in which M is a cation selected from the group consisting of $Li^+$, $Na^+$ and $K^+$ and n is in the range from 1 to 5. Preference is given to using alkali metal silicates in which n is in the range from 1 to 3 and in particular from 1.6 to 2.8. Very particular preference is given to using sodium silicate.

The aluminum source is not critical per se. Preference is given to using ionic aluminum compounds and in particular inorganic aluminum salts as aluminum source (referred to above as "aluminum compounds"). Examples are aluminum hydroxide, aluminum oxide, sodium aluminum dioxide and alums.

Aluminum hydroxide is very particularly preferred as aluminum source for the purposes of the present invention. It can, firstly, be used in solid form, in which case it has to be present in finely divided form having a particle size below 1 µm.

However, it is preferably used in the form of an aqueous solution (aluminate solution). Here, particular preference is given to using aluminate solutions having an aluminum content in the range from 10 to 22% (percentage indicated is percentage by weight of $Al_2O_3$ based on the totality of the aqueous aluminate solution).

As indicated above, the reaction mixture after introduction of the total amount of the aluminum compound is cooled to room temperature (which for the present purposes means a temperature range from 5 to 30° C. and in particular from 20 to 25° C.) as soon as the reaction mixture is clear. This is an important feature for the success of the process. In practice, this means that the reaction mixture generally becomes turbid during the addition of the aluminum source to the initially charged water glass solution. As soon as the total amount of the aluminum compound has been introduced, it is important that the reaction mixture be checked optically (site monitoring) to determine when it becomes clear. As soon as it becomes clear, cooling is commenced. The point in time when the reaction mixture becomes clear can depend on the rate of introduction of the aluminum source and the reaction temperature. Should it not occur at the end of the addition of the aluminum source or shortly afterwards, the reaction mixture is simply stirred further at the previous reaction temperature until it becomes clear, after which it is cooled.

The cooling of the reaction mixture, as indicated after complete addition of the aluminum source, is preferably carried out immediately after it has become clear.

In an embodiment, the aqueous solutions of silicates (water glasses) contain from 25 to 35% by weight of $SiO_2$,
from 12 to 16% by weight of $Alk_2O$, where Alk is lithium, sodium or potassium, and
from 0.5 to 3% by weight of $Al_2O_3$.

In a further embodiment, the aqueous solutions of silicates (water glasses) contain
from 25 to 35% by weight of $SiO_2$,
from 12 to 16% by weight of $Alk_2O$, where Alk is lithium, sodium or potassium, and
from 1.0 to 2.5% by weight of $Al_2O_3$.

The solids content of the Al-containing aqueous solutions of silicates (water glasses) according to the invention is preferably 25-50% by weight and in particular 35-45% by weight.

The invention further provides, firstly, clear aqueous solutions of silicates (water glasses) which contain
from 20 to 40% by weight of $SiO_2$,
from 10 to 20% by weight of $M_2O$, where M is a cation selected from the group consisting of $Li^+$, $Na^+$, $K^+$, $NY_4^+$ and Y is an alkyl or alkenyl radical having from 1 to 6 carbon atoms,
from 0.5 to 6% by weight of $Al_2O_3$ and
water
and are stable on storage at 20° C. for at least six months, wherein these solutions can be obtained by
placing an aqueous solution of a silicate (water glass) of the general formula $M_2O$ x $nSiO_2$, where M is a cation selected from the group consisting of $Li^+$, $Na^+$, $K^+$, $NY_4^+$ and Y is an alkyl or alkenyl radical having from 1 to 6 carbon atoms and n is in the range from 1 to 5, in a reaction vessel and
introducing an aluminum compound in such a way that the viscosity of the reaction mixture remains below 10 000 mPas and carrying out the reaction in the temperature range from 20 to 140° C.,
with the proviso that the reaction mixture after introduction of the total amount of the aluminum compound is cooled to room temperature as soon as the reaction mixture is clear.

The Al-containing silicate solutions which can be obtained by the process of the invention can be used in a variety of fields of use. Examples are: fire retardant coatings, auxiliaries for agglomeration, coating agents for pigments, inorganic adhesives.

EXAMPLES

Abbreviations

DI water=deionized water
SC=solids content
WR=weight ratio of $SiO_2$/alkali metal oxide in alkali metal water glasses

EXAMPLES ACCORDING TO THE INVENTION

Example 1

400 g of sodium water glass 60 (46% SC, WR=2) (from Cognis) were placed in a 500 ml stainless steel pressure bomb, stirred by means of a magnetic stirrer bar and 10 g of aluminum hydroxide KB30 (from Alcoa) were sprinkled into the stirred vessel. The bomb was closed so as to be pressure-tight and was heated to 120° C. on a hotplate. After 120° C. had been reached, the bomb was immediately cooled back down to room temperature and the slightly opaque solution was filtered through a 50 μm sieve to give a clear transparent solution.

Analysis: 30% of $SiO_2$ 14.5% of $Na_2O$ 1.3% of $Al_2O_3$

Example 2

200 g of sodium water glass 48/50 (45% SC, WR=2.7) (from Cognis) were mixed with 30 g of 50% sodium hydroxide solution (Fluka) by means of a magnetic stirrer bar in a conical flask to give a clear streak-free solution. 7 g of finely divided aluminum hydroxide (Apyral $200^{SM}$, from Nabaltec) were sprinkled into the stirred vessel. The white, turbid mixture was heated to 100° C. under reflux by means of a hotplate. A virtually transparent mixture was formed within half an hour. After cooling to room temperature, the mixture was filtered through a 50 μm sieve.

Analysis: 28% of $SiO_2$ 15% of $Na_2O$ 1.8% of $Al_2O_3$

Example 3

135 g of Portil A (sodium water glass powder 80% SC, WR=2) (from Cognis) and 100 ml of DI water were mixed by means of a magnetic stirrer bar in a conical flask to give a suspension. 4 g of finely divided aluminum hydroxide (Apyral $200^{SM}$, from Nabaltec) were sprinkled into the stirred vessel. The white turbid mixture was heated to 100° C. under reflux by means of a hotplate. A virtually transparent mixture was formed within half an hour. After cooling to room temperature, the mixture was filtered through a 50 μm sieve.

Analysis: 31% of $SiO_2$ 15.5% of $Na_2O$ 1% of $Al_2O_3$

Example 4

200 g of sodium water glass 48/50 (45% SC, WR=2.7) (from Cognis) were mixed with 30 g of 50% sodium hydroxide solution (Fluka) by means of a magnetic stirrer bar in a conical flask to give a clear streak-free solution and heated to 40° C. 50 g of sodium aluminate solution (Gecedral, from Giulini) were introduced dropwise into the stirred vessel over a period of 1 hour. The mixture, which was turbid because of gel particles, was heated to 80° C. A transparent mixture was formed within 1 hour. After cooling to room temperature, the mixture was filtered through a 50 μm sieve.

Analysis: 28% of $SiO_2$ 15.5% of $Na_2O$ 4% of $Al_2O_3$

Example 5

200 g of sodium water glass 50/52 (48% SC, WR=2.4) (from Cognis) were placed in a conical flask and 40 g of a sodium carbonate/water mixture (50% SC, from Solvay) were added dropwise and mixed by means of a magnetic stirrer bar and heated to 50° C. 26 g of sodium aluminate solution (38%, from Nordisk) were introduced dropwise into the stirred vessel over a period of 1 hour. The mixture was then heated to 80° C. A transparent mixture was formed within 15 minutes. After cooling to room temperature, the mixture was filtered through a 50 μm sieve.

Analysis: 28% of $SiO_2$ 12.5% of $Na_2O$ 2% of $Al_2O_3$

Example 6

170 g of sodium water glass 50/52 (48% SC, WR=2.4) (from Cognis) were mixed with 30 g of potassium water glass 54 (52% SC, WR 1.42) by means of a magnetic stirrer bar in a conical flask to give a clear streak-free solution and heated to 40° C. 22 g of sodium aluminate solution (Gecedral, from Giulini) were introduced dropwise into the stirred vessel over a period of 1 hour. The mixture, which was turbid because of gel particles, was heated to 80° C. A transparent mixture was formed within half an hour. After cooling to room temperature, the mixture was filtered through a 50 μm sieve.

Analysis: 30% of $SiO_2$ 10.5% of $Na_2O$ 3% of $K_2O$ 1.9% of $Al_2O_3$

Example 7

30 g of sodium aluminate solution (alumin10; from Remondis) and 20 g of water were placed in a glass beaker and heated to 40° C. while stirring by means of a metal blade stirrer. 200 g of sodium water glass 54/56 (55% SC, WR 2.05) were added dropwise over a period of 30 minutes. The mixture was heated to 80° C. A transparent mixture was formed within 1 hour. After cooling to room temperature, the mixture was filtered through a 10 μm filter.

Analysis: 30.5% of $SiO_2$ 16% of $Na_2O$ 2.6% of $Al_2O_3$

Example 8

75 g of DI water, 90 g of 50% sodium hydroxide solution (Fluka), 5.5 g of lithium hydroxide hydrate (from FMC) and 80 g of Köstrosolid 0403 (precipitated silica, from Köstritz) were mixed by means of a magnetic stirrer bar in a conical flask to give a suspension. 8 g of finely divided aluminum hydroxide (Apyral 200$^{SM}$, from Nabaltec) were sprinkled into the stirred vessel. The white turbid mixture was heated to 100° C. under reflux by means of a hotplate. A virtually transparent mixture was formed within half an hour. After cooling to room temperature, the mixture was filtered through a 50 μm sieve.

Analysis: 30% of $SiO_2$ 14% of $Na_2O$ 1.5% of $Li_2O$ 2.6% of $Al_2O_3$

All solutions prepared in the precipitation examples remain stable, without separation or crystallization, during storage at room temperature.

COMPARATIVE EXAMPLES

The two comparative examples C4-1 and C4-2 below serve for comparison with the above example 4 according to the invention:

Comparative example C4-1

200 g of sodium water glass 48/50 (45% SC, WR=2.7) (from Cognis) were mixed with 30 g of 50% sodium hydroxide solution (Fluka) by means of a magnetic stirrer bar in a conical flask to give a clear streak-free solution and heated to 90° C. 50 g of sodium aluminate solution (Gecedral, from Giulini) were introduced dropwise into the stirred vessel over a period of 1 hour. The turbid mixture was heated at 100° C. for 2 hours. The turbidity of the mixture did not change to clear, and further stirring led to even more turbidity. Owing to the filter becoming blocked, the mixture obtained in this way could not be filtered even through a 200 μm sieve. After cooling to room temperature, the solution became whitish turbid on being allowed to stand, and a white sediment began to separate out after about three weeks.

Comparative example C4-2

200 g of sodium water glass 48/50 (45% SC, WR=2.7) (from Cognis) were mixed with 30 g of 50% sodium hydroxide solution (Fluka) by means of a magnetic stirrer bar in a conical flask to give a clear streak-free solution. 40 g of water were added to reduce the viscosity. 60 g of sodium aluminate solution (Gecedral, from Giulini) were introduced dropwise into the stirred vessel over a period of 1 hour. The turbidity of the mixture did not change to clear, neither as a result of further stirring nor as a result of filtration or heating. The whitish turbid dispersion tended to separate after only days.

The invention claimed is:

1. A process for preparing clear aqueous solutions of silicates (water glasses) which contain:
   from 20 to 40% by weight of $SiO_2$,
   from 10 to 20% by weight of $M_2O$, where M is a cation selected from the group consisting of $Li^+$, $Na^+$, $K^+$, and $NY_4^+$, wherein Y is an alkyl or alkenyl radical having from 1 to 6 carbon atoms,
   from 0.5 to 6% by weight of $Al_2O_3$ and
   water
   and are stable in storage at 20° C. for at least six months, the method comprising
   placing an aqueous solution of a silicate (water glass) of the general formula $M_2O$ x $nSiO_2$, where M is a cation selected from the group consisting of $Li^+$, $Na^+$, $K^+$, and $NY_4^+$, wherein Y is an alkyl or alkenyl radical having from 1 to 6 carbon atoms and n is in the range from 1 to 5, into a reaction vessel to provide a reaction mixture;
   introducing an aluminum compound into the reaction mixture in such a way that the viscosity of the reaction mixture remains below 10 000 mPas;
   reacting the aqueous solution of a silicate and aluminum at a temperature range of from 20 to 140° C.; and
   cooling the reaction mixture after introduction of the total amount of the aluminum compound to room temperature as soon as the reaction mixture is clear.

2. The process of claim 1, wherein M is a cation selected from the group consisting of $Li^+$, $Na^+$, and $K^+$.

3. The process of claim 1, wherein M is the cation $Na^+$ and the sodium silicate used in the reaction has the formula $Na_2O$ x $nSiO_2$, where n is in the range from 1.6 to 2.8.

4. The process of claim 1, wherein aluminum hydroxide is used as the aluminum compound.

5. The process of claim 3, wherein aluminum hydroxide is used in the form of a powder whose particle size is below 1 μm.

6. The process of claim 3, wherein aluminum hydroxide is used in the form of an aqueous solution.

7. The process of claim 1, wherein the reaction is carried out in the temperature range of from 60 to 80° C.

8. The process of claim 1, wherein the aluminum compound is introduced in such a way that the viscosity of the reaction mixture remains below 1000 mPas.

* * * * *